United States Patent [19]

Rolland

[11] 4,430,879
[45] Feb. 14, 1984

[54] APPARATUS FOR CONTROLLING A PRESS BRAKE

[75] Inventor: Burton A. Rolland, Zionsville, Ind.

[73] Assignee: Hurco Manufacturing Company, Inc., Indianapolis, Ind.

[21] Appl. No.: 273,231

[22] Filed: Jun. 12, 1981

[51] Int. Cl.³ .............................................. B21D 11/22
[52] U.S. Cl. ....................................... 72/389; 72/36; 72/461
[58] Field of Search .................... 72/389, 386, 461, 36, 72/32, 34, 35; 364/475, 476, 142

[56] References Cited

U.S. PATENT DOCUMENTS

| | | | |
|---|---|---|---|
| 3,618,349 | 11/1971 | Roch | 72/8 |
| 3,824,822 | 7/1974 | Richardson | 72/36 |
| 3,826,119 | 7/1974 | Marotto | 72/36 |
| 3,874,205 | 4/1975 | Roch | 72/461 |
| 4,074,350 | 2/1978 | Roch | 364/474 |
| 4,115,859 | 9/1978 | Brisk | 364/142 |
| 4,131,008 | 12/1978 | Malatto | 72/389 |

FOREIGN PATENT DOCUMENTS

| | | | |
|---|---|---|---|
| 2362722 | 3/1978 | France | 72/389 |
| 55-126400 | 9/1980 | Japan | 72/386 |
| 1549676 | 8/1979 | United Kingdom . | |

Primary Examiner—Gene P. Crosby
Attorney, Agent, or Firm—Woodard, Weikart, Emhardt & Naughton

[57] ABSTRACT

A controller for a press brake, which provides for the accurate sequential bending of sheet metal by a press brake. The controller includes a microprocessor arrangement for operating a press brake in response to manually entered input to control a gauge stop and to produce output control signals relating to the relative positioning of the ram and die which positioning causes an angle of bend in a workpiece. Included is a sensing device for sensing the actual angle of bend in the workpiece and means for comparing the actual angle of bend to a desired angle. By such a comparison, the manual inputting of complex variables which are required to predetermine the precise relative positioning of the ram and die are made unnecessary. Further, feedback relating to the springback of the workpiece material causes sequential re-cycling of the press brake thereby improving the accuracy of the resulting angles produced. Also provided in conjunction with the optical digitizer is a safety zone detection arrangement which automatically shuts off the operation of the press brake in the event that either a worker or an undesired object comes within a predetermined range of the operational area.

3 Claims, 2 Drawing Figures

APPARATUS FOR CONTROLLING A PRESS BRAKE

BACKGROUND OF THE INVENTION

1. Field of the Invention

The invention relates generally to apparatus for controlling a press brake, more specifically the invention relates to automated apparatus for sequentially positioning a gauge and a ram of a press brake during the operation of causing a series of bends in a workpiece.

2. Description of the Prior Art

In recent years there has been substantial development in the area of automation of press brakes and other metal forming machinery. U.S. Pat. No. 3,618,349 issued to Gerald V. Roch on Nov. 9, 1971 discloses a relatively early application of automation in this area, and relates to a gauging system which includes the automatic programmed control of gauges on a press brake. U.S. Pat. No. 3,874,205, a patent issued to Gerald V. Roch and Edward H. Sonn on Apr. 1, 1973, is another patent in the area of press brake automation. This patent discloses a pre-programmable system and incorporates variable ram closing and return stroke lengths.

Recently microprocessors have been incorporated in more sophisticated automatic press brake control. U.S. Pat. No. 4,074,350 issued to Gerald V. Roch and James P. Wiles on Feb. 4, 1978 discloses a softwire control which includes a microprocesser to execute operating instructions according to a program stored in a program memory. U.S. Pat. No. 4,115,859 to Brisk et al. (issued Sept. 19, 1978) and British Pat. No. 1,549,676 to Arthur et al. (published Aug. 1, 1979) are two additional patents which disclose automated press brake controls incorporating microprocessors.

One complex aspect in the ram control of a press brake is the calculation or determination of the ram drive commands in order to reach the desired angle of bend in the workpiece. A number of variables affect the ultimate angle which is obtained; such as the thickness or kind of material which is being bent, the extent of the angle of bend which is to be caused, the size of the die opening and the calibration between the ram and the die.

Particularly, the "springback" of the metal workpiece is extremely difficult to predict. "Springback" is the tendency of the work material to spring back towards its original position after the pressure of the ram has been released. The extent to which material may spring back is subject to a number of factors and is not readily predetermined. Even with the same material, having the same characteristics within commercially accepted tolerances, the extent of springback may vary up to one degree.

Control apparatus of the prior art either provides for the specific positioning to be manually inputted, or provides for a means of calculating or estimating the positioning that would cause the desired angle after certain variables which affect that angle have been inputted. The prior art does not provide for interactive or sequential correction for workpiece springback in the operation of a press brake.

Optical digitizers have been used in a variety of fields. Such digitizers have a capability of converting optical reception into digital data. Optical digitizers have been used for purposes of monitoring and surveillance; inspection and precision measurement; part sorting and selection; medical analysis; and various types of automated manufacturing. They have not been used in the field of automated control of press brakes.

SUMMARY OF THE INVENTION

In general terms, the illustrated embodiment provides for a microprocessor controller for a press brake, and relates to specific apparatus which provides for the accurate sequential bending of sheet metal by a press brake. The illustrated embodiment includes microprocessor means for operating a press brake in response to manually entered input to control a gauge stop and bend angle. An optical digitizer senses the actual angle of bend in the workpiece and inputs control signals to the microprocessor which compares the actual angle of bend to a desired angle. By such a comparison, the necessity of such complex variables which are required to predetermine the precise relative positioning of the ram and die are made unnecessary. Further, feedback relating to the springback of the workpiece material causes the ram to re-stroke deeper into the die as many times necessary to accurately produce the desired angle. Also provided in conjunction with the optical digitizer is a safety zone detection means which automatically shuts off the operation of the press brake in the event that either a worker or an undesired object comes within a predetermined range of the operational area.

DESCRIPTION OF THE PREFERRED EMBODIMENTS

Figure 1:
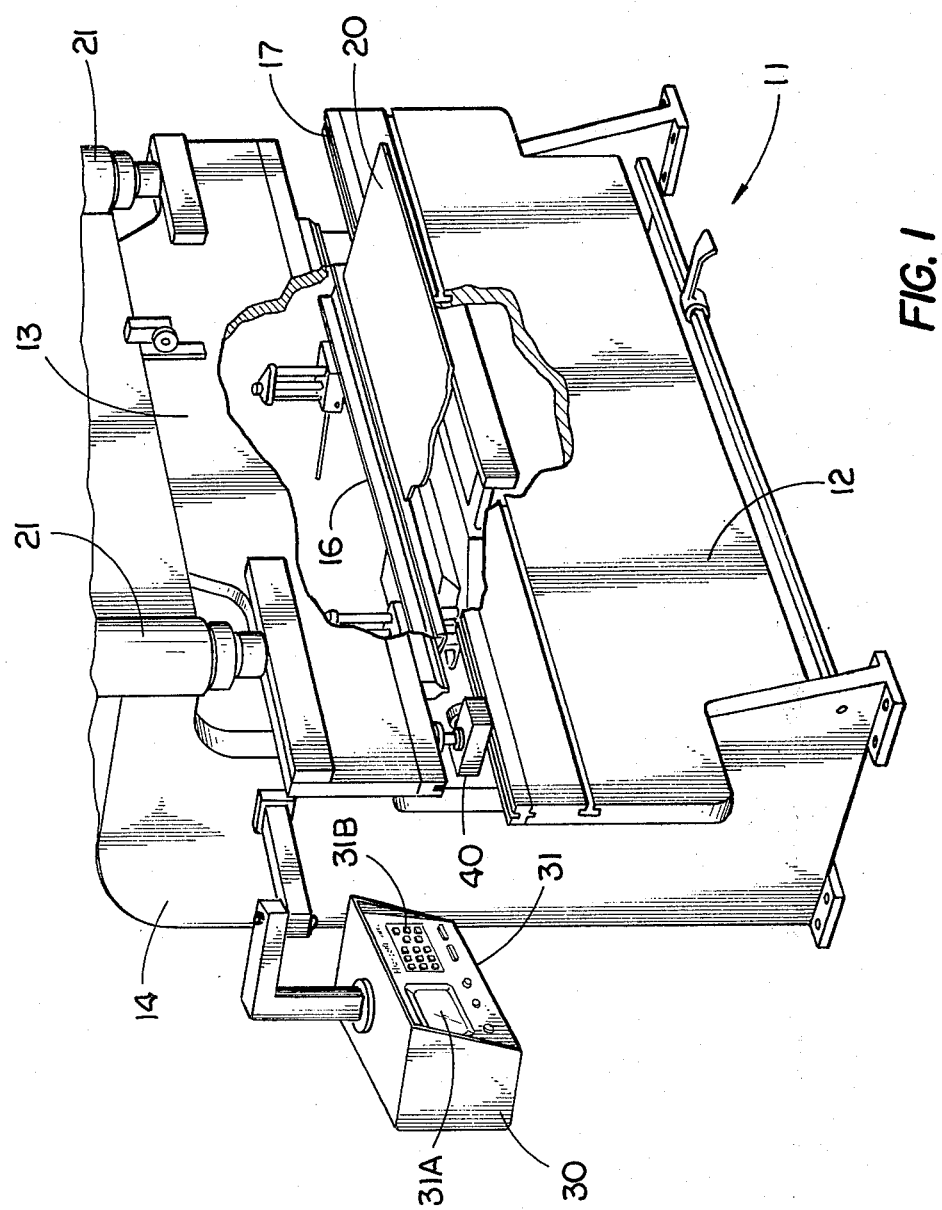
FIG. 1 is a general perspective view of a press brake which is adopted with a controlling apparatus of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the drawings, FIG. 1 displays a portion of a press brake 11 which has been incorporated with an automated control system of the present invention. Press brake 11 has a bed 12, ram 13 and side frame 14. Gauge stop 16 is mounted to the bed behind lower die 17, and can be driven by linear lead screws driven by an electric motor 16A. The ram 13 is driven by a pair of hydraulic cylinders 21, however may also be mechanically driven.

Pendant control cabinet 30 is swivel mounted to side frame 14. Pendant control cabinet 30 includes display 31 which has incorporated output display 31A and data input board 31B. A conventional optical digitizer 40 is mounted to ram 13 and is positioned to view the relative positions of ram 13, lower die 17, and workpiece 20. Alternatively, optical digitizer 40 could be mounted to lower die 17, or another frame of reference.

Figure 2:
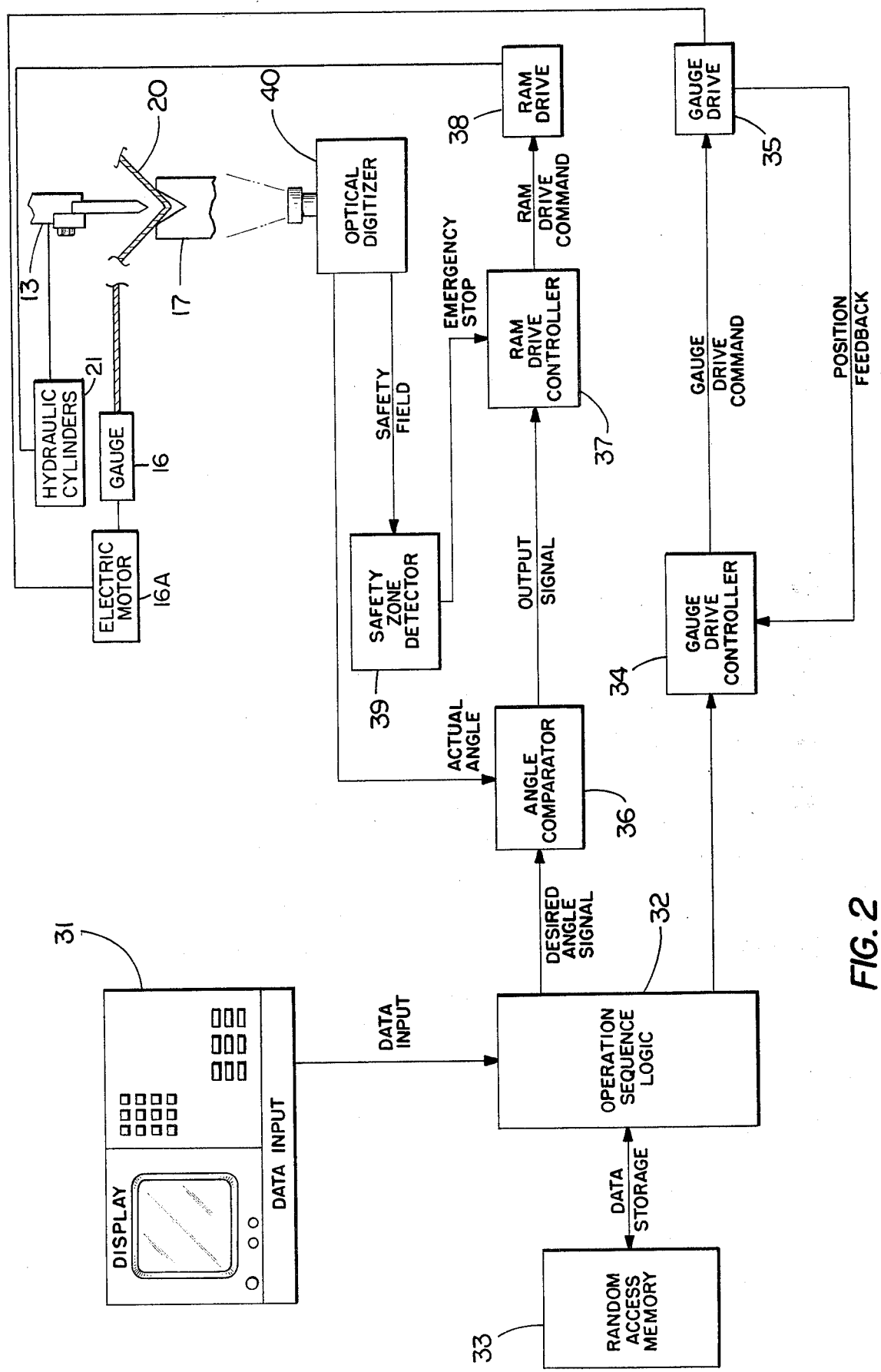
FIG. 2 is a schematic diagram of the controlling apparatus of FIG. 1.

FIG. 2 is a schematic illustration of the control apparatus which is programmable to automatically and sequentially control ram 13 and gauge 16 to cause a series of bends in workpiece 20. Data input display panel 31 includes a numerical keyboard for sequential input of desired angle of bend and gauge position data numbers, and also for the input of instructions for processing the inputted data. Also located on display panel 31 is an output display of current data.

The data and instructional input is received by operation sequence logic 32, which includes microprocessor means for processing the received digital data according to the inputted instructions to produce output control signals. Operation sequence logic 32 utilizes random access memory 33 for data storage. Operation sequence logic 32 sequentially produces gauge position signals and desired angle signals. Gauge position signals are received by a conventional gauge drive controller 34. In response to the gauge position signals, gauge drive controller 34 causes gauge drive 35 to sequentially position the gauge stop 16 of press brake 11. Position feedback is provided from gauge drive 35 to gauge drive controller 34.

Specific microprocessing apparatus which is suitable for the operational sequence aspect of the present invention is described in U.S. Pat. No. 4,074,350 SOFT-WIRED MACHINE TOOL CONTROL to Gerald V. Roch and James P. Wiles.

Angle comparator 36, and optical digitizer 40 schematically represent the microprocessing means of the control apparatus of the present invention which produces output signals to ram drive controller 37 that will produce extremely accurate final angle production in workpiece 20.

Angle comparator 36 includes microprocessor means for comparing the actual angle of optical digitizer 40 of the workpiece with the comparison angle which is supplied through the data input board 31B. Given the digital input from optical digitizer 40 and the desired angle input, this comparison may be conventionally made by any of a variety of computer processing techniques. In response to this comparison, angle comparator 36 produces output signals to ram drive controller 37, which in turn commands ram drive 38 to relatively position ram 13 with die 17. Feedback of the relative positioning of ram 13 and die 17 is received by ram drive controller 37 via optical digitizer 40. By this manner, ram 13 is driven until the actual angle of bend equals the comparison angle, at which time the ram is released. The ram is raised until the material being formed is in a relaxed condition and the angle is then compared again. This sequence is repeated until the angle of the part equal the desired angle.

Accurate angle bends are thus produced unaffected by varying conditions of the work material which affect springback characteristics from one workpiece to the next. Furthermore, there is no need for the input of complicated variables, or for the complex estimation for determining the relative ram and die positions to cause a desired angle of bend, and the normal steps of calibration are also eliminated.

Finally, safety zone detector is programmed to detect movement within a "safety" field, other than the operational movement of the brake press and workpiece. This is accomplished by receiving and monitoring a field signal from optical digitizer 40. When such unexpected movement is detected, safety zone detector shuts off the operation of ram drive controller 37. In this manner, the operator of the machine is protected from inadvertantly coming into the operational area of the machine.

The microprocessing means have been hereinabove schematically described; their specific details with respect to their programming and their interrelationship with respect to functions as described may vary and still fall within the scope of the invention. Therefore, while there have been described above the principles of this invention in connection with specific apparatus and techniques, it is to be clearly understood that this description is made only by way of example and not as a limitation to the scope of the invention.

What is claimed is:

1. Apparatus for controlling a press brake during a series of bends in a workpiece, the press brake including a gauge, a ram, and a die, said apparatus comprising:
    (a) input means for providing for the input of data indicating desired angles of bend and gauge positions and for the input of instructions for processing said data;
    (b) operation sequence processing means for processing said data according to said instructions to produce output control signals, said control signals including gauge position signals and angle of bend signals;
    (c) means for positioning said gauge in response to said gauge position signals produced by said processing means; and
    (d) bending operation means for causing angles of bend in the workpiece in response to said angle of bend signals produced by said operation sequence processing means, said bending operation means including
        (i) sensing means for sensing the actual angle of bend of the workpiece,
        (ii) comparator means for comparing the actual angle of bend of the workpiece with a comparison angle, the comparison angle bearing a relationship to the angle of bend signal produced by said operation sequence processing means,
        (iii) command means for producing ram and die relative position output signals in response to the comparison between the actual angle of bend of said workpiece and the comparison angle; and
        (iv) means for positioning said ram relative to said die in response to said relative ram and die relative position output signals.

2. The apparatus of claim 1 in which said sensing means includes optical digitizer means for translating electronic video input into digital data.

3. The apparatus of claim 1 additionally comprising springback compensation means for compensating for the springback of said workpiece, said compensating means including means for determining the comparison angle in response to the angle of bend signal produced by said operation sequence means, wherein springback after a bend to the comparison angle causes the machine cycle to repeat until the angle of the bend equals the desired angle.

* * * * *